United States Patent Office 3,003,239
Patented Oct. 10, 1961

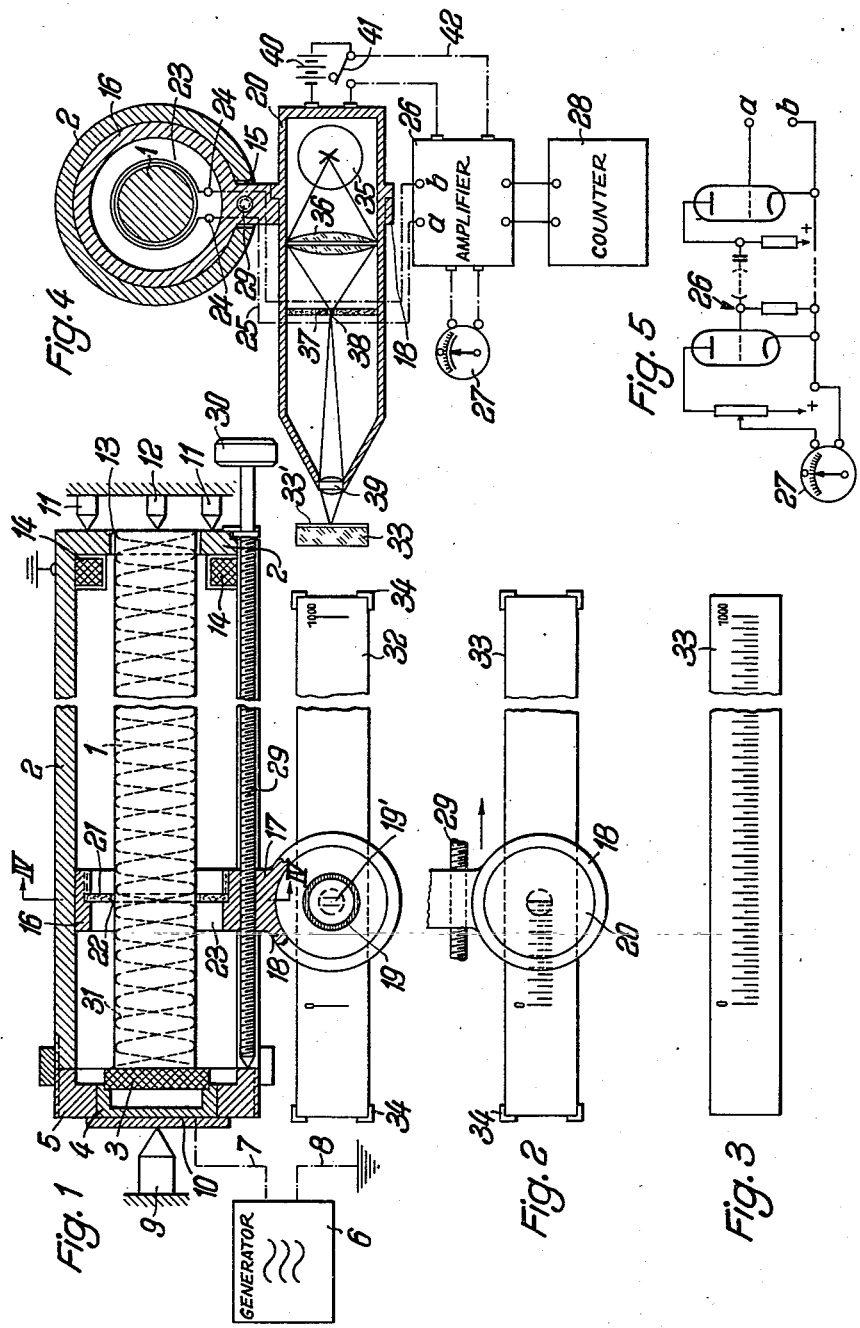

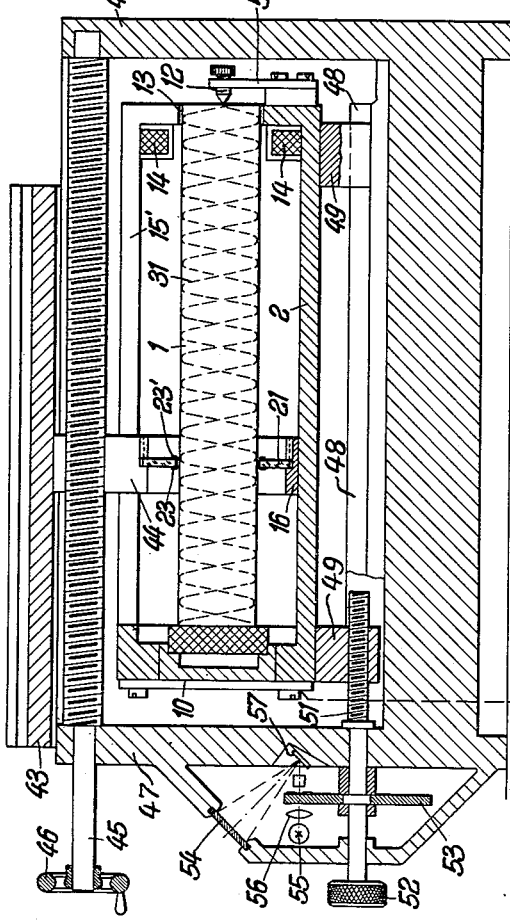

3,003,239
METHOD AND APPARATUS FOR MEASURING LENGTHS BY MEANS OF SOUND WAVES
Karl Benno Weidner and Heinz Jaenicke, Berlin, Germany, assignors to Erich Hoffmann, Werkstätten für Optik und Präzisionsmechanik, Berlin, Germany
Filed Feb. 21, 1956, Ser. No. 567,000
Claims priority, application Germany Feb. 26, 1955
14 Claims. (Cl. 33—1)

The present invention relates to a method and an apparatus for measuring lengths, and particularly to such measuring methods and apparatus operating by means of sound waves, particularly ultrasonic waves.

The invention also relates to apparatus for carrying out the method having the object of producing graduations with accurate intervals, or of measuring lengths composed of graduation intervals. For this purpose a magnetizable or magnetic measuring bar has a transmitting quartz crystal at one end while at the other end, which is open to air, an exciting coil is arranged, supported by a longitudinally slotted magnetic cover surrounding said measuring bar. The cover is at one end connected with the support of the transmitting quartz crystal, while its other end is opposite the bar by the width of the gap. The inside of the cover serves as guide track for an indicator provided with a measuring loop. This indicator is connected in the longitudinal slot of the cover with an adjusting gear, with a measuring instrument and a recording instrument which latter transfers the position of the indicator upon the measuring bar.

In accordance with another feature of the invention the measuring loop is fixed electrolytically upon a carrier glass plate, which has an opening for the magnetic bar, the loop being concentrical around said opening in a thickness of $1\mu$. The adjustment is suitably done in accordance with the nodes of the standing wave, these adjustments being very accurate and their values being of the order of the thickness of the measuring loop. When tracing the nodes a vacuum-tube voltmeter connected to the measuring loop across an amplifier, is observed. The zero position of this voltmeter indicates that the measuring loop is accurately set to the node. At every adjustment the recording instrument is actuated which, in accordance with the invention, contains a flashlight bulb and a lens separated by a gap from the bulb, which projects the graduation line formed by the gap, upon the magnetic bar arranged in the focus of the lens. This bar is coated with a non-granular photographic emulsion. Suitable as a carrier of this emulsion is a glass rod which after all graduation lines having been flashed should be developed or otherwise photochemically treated, causing the graduation lines to appear as fine metallic or etched lines upon the bar. It is also possible to use this glass bar for the making of other scales.

In order to facilitate the count of the graduation lines the recording instrument is provided with a preferably electronic counting or integrating device which effects counting simultaneously with the actuation of the recording instrument. For instance, it is possible upon each tenth graduation line to change the lens gap so as to form a longer graduation line.

Another object of the invention consists in apparatus for the making of measuring lengths composed of graduation intervals, such as for the setting of slides on measuring instruments or machine tools. In accordance with the invention slide adjustments may be performed without the use of scales with graduation lines which might contain interval errors. For this reason the magnet, the transmitting quartz, and the indicator are arranged inside the guide track of a traversing slide and the indicator mounted to the slide and connected with a counting device, preferably an electronic one, while the magnetic system is axially displaceable from its zero position by means of a precision gearing provided with an optical interval divisor in order to set the decimal value by displacement of the zero point in accordance with the integral multiple of $\lambda/2$.

In tracing the magnetic bar during the passage of a maximum or minimum, impulses in accordance with the relevant connection are given upon the counting device, thus recording the sum of the impulses, that is, the integral multiple of $\lambda/2$. $\lambda/2$ is adjusted in such way that each interval is exactly 1 mm. so that the interval of the measuring lengths may be read on the counting device, while any fraction of the last measuring interval traversed is indicated at the scale of the optical interval divisor.

In order not to induce any voltages in the measuring loop by cutting magnetic lines of force during the displacement thereof longitudinally of the magnetic bar, in accordance with the invention on both sides of the carrier glass plate two measuring loops are provided of exactly equal value and being electrically oppositely connected. The distance of the loops from each other is $\lambda/2$ or an odd multiple of $\lambda/2$. For this reason the carrier plate upon which the measuring loops are deposited has a thickness of $\lambda/2$ or an odd multiple of $\lambda/2$; in the case of millimeter intervals, therefore, the thickness of one millimeter. While the cut lines of force with regard to their inductive effect in the two measuring loops compensate each other exactly, the inductive effect caused by the ultrasonic vibrations is additional, the vibrations being oppositely directed. With the help of these measuring loops it is possible to carry out maxima-minima measurements, that is, to determine the exact division intervals in accordance with the wave loop.

It is an object of the present invention to use as a measuring bar a body which is penetrated by the sound waves.

It is another object of the invention to provide a length measuring apparatus using the length of the waves as the smallest measured length.

It is a further object of the present invention to avoid errors of graduation of the measuring bars which hitherto have been the cause of inaccurate measurements.

Other objects and advantages of the present invention will be apparent from the following description thereof in connection with the accompanying drawings showing, by way of example, some embodiments of the present invention. In the drawings:

FIG. 1 is a view, partly in section, of a first embodiment of a device for producing graduation lines during calibration by a focussing microscope, FIG. 2 is a view of the scale produced by the apparatus shown in FIG. 1, through division by a light gap projector, FIG. 3 is a view of the divided scale, FIG. 4 is a side elevation of FIG. 1, partly in section, the focussing microscope being replaced by a light gap projector, FIG. 5 is a wiring diagram of a vacuum tube amplifier forming part of the device shown in FIG. 4, FIG. 6 is a longitudinal section of another embodiment of a measuring apparatus according to the invention, FIG. 7 is a side elevation, partly in section, of the device shown in FIG. 6, FIG. 8 is a perspective view of elements forming part of FIG. 6, and FIG. 9 is a plan view of the graduated dial of the optical interval divisor shown in FIG. 6.

Referring now to the drawings and first to FIG. 1, a magnetic bar 1 is surrounded by a magnetic cover 2.

To the left end of said magnetic bar 1 a quartz crystal 3 of a sound transmitter is mounted to a holder 4 which is secured to an insulating part 5 connected to the cover 2. The quartz crystal 3 is connected with a high frequency generator 6 across line 7. The other pole 8 of the generator 6 is grounded, the same as the entire measuring equipment. The high frequency voltage impressed on the crystal 3 produces longitudinal mechanical vibrations in the bar 1 so that oscillating magnetic fields result therein having a plurality of discrete locations of maximum and minimum magnetic oscillations.

The magnetic cover 2 and the magnetic bar 1 are located between centers. The left hand point is indicated by 9 and presses against a pressure plate 10 while the right hand points 11 press against the magnetic cover 2. The right end of the magnetic bar is open to air and is supported by a center 12. Between cover and bar a ring slot 13 is arranged which for reason of reducing the magnetic resistance is only ⅒ mm. wide. A permanent magnet may be used as the magnetic bar. An exciting coil 14 serves for remagnetization, and is arranged at the right side of the magnetized cover 2. This coil may also form an electromagnet in conjunction with the magnetic bar 1.

The magnetic cover 2 is provided with a longitudinal slot 15. Inside the cover a sliding ring 16 is arranged having a lug 17 passing through the slot 15 and being connected outside with a receiving ring 18 into which either a well-known focusing microscope 19 with a reticle 19′ or a light gap projector 20 may be mounted.

A glass plate 21 is mounted at right angles to the axis of the magnetic bar 1 in the sliding ring 16. The glass plate 21 has a round opening 22 having an inner diameter being just so much larger than the outer diameter of the magnetic bar 1 that the sliding ring may freely move. The glass plate 21 is the carrier of a measuring loop 23 about 1μ thick fixed upon the glass plate and resting in said opening 22. The two ends of the measuring loop are connected to contacts 24 which in their turn are attached to conductors 25 which lead to the terminals $a$, $b$ of an amplifier 26 having an output circuit connected with an indicating galvanometer 27. The two apparatus together form a vacuum tube voltmeter such as is well known in measuring technique. The voltmeter is connected with an electronic counting or integrating device 28 as is also well known in measuring technology. For instance, a Philips GM4810 type integrating device may be used.

The lug 17 which supports the receiving ring 18 is tapped for a threaded spindle 29 which is axially non-displaceably but rotatably arranged in the slot 15 of the cover and which may be adjusted by knob 30. In this case the sliding ring including the glass plate 21 and the loop 23 is displaced along the magnetic bar 1 to trace inductively a standing wave 31 in the magnetic bar which is generated by quartz crystal 3. The wave length and thus the natural frequency of the quartz crystal 3 should be chosen, when the process is carried out according to the metric system, in such a manner that the original meter, whose starting and end division lines are fixed in a reference scale 32 is exactly divided in to 1000 graduation intervals, making λ/2 exactly 1 mm.

If, therefore, initially the electronic integrating device 28 records 1000 impulses between the starting and the end marks of the reference scale, and at the beginning of measuring the starting mark and after passing the measuring length at the 1000th interval the end mark coincides exactly with the scale division 19′ of the focusing microscope, then it is certain that the correct wave length has been used. Thereupon the reference scale 32 is replaced by a glass scale 33 which is to be provided with division lines. These scales are supported by brackets 34 which fix the position of the reference scale relative to scale 33. If, now, the focusing microscope 19 is replaced by the light gap projector 20, as shown in FIGS. 2 and 4, the division lines can be transferred to scale 33 by tracing the standing wave in the magnetic bar 1, without any interval errors making their appearance.

The light gap projector 20 contains a flashlight bulb 35, a convex lens 36, a diaphragm 37 with a gap 38 and an objective 39. The flashlight bulb 35 is fed by a battery 40 the circuit of which is closed by a key 41. The image of the gap 38 produces on the photo emulsion 33′ of the carrier plate 33 the graduation line to be transferred.

Flashing occurs when the pointer of the galvanometer 27 is at zero, if the nodes of the standing wave are traced. If the maxima are traced the pointer should indicate the maxima deflection. At every interval whose exact position is seen at the measured instrument the flashlight is actuated by hand. However, it is also possible to arrange the circuit in such a way that the flash takes place automatically. For this purpose the amplifier 26, is connected to the contacts of the key 41, along the dot and dash conductors 42, and replaces same. The impulses for flashing may, for instance, be given by means of contacts at the pointer galvanometer 27.

FIG. 2 shows an intermediate position during graduation of the scale; and FIG. 3 shows the completely graduated scale.

FIGS. 6 to 9 show an apparatus designed along the same principles for measuring lengths in connection with the traverse of a slide 43 of a machine tool. The sliding ring which supports the indicator, is connected with a slide 43 by a flange 44 which moves in the slot 15′. A longitudinal displacement is caused by a spindle 45 of the slide which is furnished with a handwheel 46. The spindle is axially non-displaceably arranged in a machine frame 47. The magnetic bar 1 and its cover 2 are of the same design as shown in FIG. 1. However, instead of being mounted between centers, the cover is movable on a longitudinal slide 48 by counter supports 49. The magnetic bar 1 is mounted between the pressure plate 10 and the center 12, which latter is arranged at the arm 50 coaxially adjustably to the magnetic bar. The magnetic system, traced by the indicator, is adjustable for setting the decimal values by a handwheel 52 over a precision spindle 51 having a pitch of exactly 1 mm. The zero position prior to starting the measurement is set at a scale disc 53 to the decimal value which is optically magnified and projected upon the screen 54, rendering its reading an easy matter. The scale disc 53 is transparent. The set number of the scale 53′ is projected upon the screen 54 by the light source 55, the lens 56, and the mirror 57. Starting from any zero position the intervals corresponding to the length of the measuring path are integrated by the electronic counting device 28 from node to node or from maximum to maximum of the standing wave 31. The integer is read before the decimal point of the measuring length, while the decimal value is read at the previously described interval divisor at the screen 54. The carrier glass plate 21 is provided, as shown in FIGS. 6 and 8, with two measuring loops 23 and 23′ which are electrically equivalent and, the current flowing in them in opposite turns, connected in series. The thickness of the carrier glass plate 21 amounts to λ/2 or an odd multiple of λ/2. In case of millimeter intervals the thickness of the glass plate is exactly 1 mm. In this way maxima-minima measurements may be carried out by means of the indicator 21, 23, and 23′, as was described previously.

According to whether the lengths to be measured are composed of several small lengths following each other, or whether single lengths are to be measured, the counting or integrating device 28 adds the lengths or is set again to zero.

The apparatus makes it possible to set exact traverses by means of the measuring device, which is calibrated but once, without the divisions of the scale being visible.

The interval errors encountered hitherto which often exceeded the admissible tolerances laid down for machine tools, are avoided with this apparatus.

Thus it is seen that according to the invention the ultrasonic wave is generated in a medium the length of which is a multiple of $\lambda/2$, and that $\lambda/2$ or a multiple of $\lambda/2$ is a graduation unit between a starting mark and an end mark, so that either a maximum or a minimum of the standing wave will pass through the starting mark and the end mark, and that the maxima or minima of the standing wave are transferred either singly for the generation of graduation intervals, or are transferred for the setting of measured lengths which are composed of graduation intervals and added up.

In order to measure according to the metric system the original meter, the starting and ending marks of which are fixed, has been divided into 1000 intervals, making $\lambda/2$ exactly 1 mm. If greater exactness is desired a higher sound frequency should be chosen, making $10 \times \lambda/2$ a graduation interval of 1 mm. The wave length and, therefore, the natural frequency of quartz crystals must be chosen accordingly. Preferably the wave, which is generated in a medium, for instance, a measuring bar, is adjusted by means of a reference scale which is parallel to the measuring bar and has starting and end markings, respectively, whereupon the reference scale is replaced by the bar to be graduated and on which the intervals of the maxima or minima of $\lambda/2$ are then marked down.

A particularly advantageous embodiment of the invention, which facilitates the transfer of the graduation intervals, consists in generating the ultrasonic field in a magnetic bar or tube and in having the mechanical vibrations of the molecular magnets inductively traced within the standing wave.

We have described hereinabove preferred embodiments of methods and apparatus for measuring length by means of sound waves, and particularly ultrasonic waves. However, we wish it to be understood that many changes, alterations, and substitutions of equivalents may be made in the embodiments described hereinabove, our invention being defined by the appended claims.

We claim:

1. The method of producing a multi-indicia scale, comprising the steps of generating in a magnetic bar a standing ultrasonic wave having two sets of alternating nodal and antinodal extremes and a predetermined wavelength $\lambda$, with $\lambda/2$ being exactly equal to the desired spacing between each of said indicia and the next adjacent indicium, positioning adjacent said magnetic bar a reference member provided with accurately spaced end gauge marks corresponding to the intended opposite end indicia of said scale to be produced, moving an electrically conductive loop along said magnetic bar to first sense by means of voltage induction in said loop one of said extremes of one of said sets while simultaneously sighting one of said end gauge marks on said reference member, thereafter moving said loop along said magnetic bar until the other end gauge mark is sighted to ensure that, upon sighting of the latter, said loop inductively senses another extreme of said one set and that the number of said extremes of said one set sensed from said one to said other of said extremes of said one set is exactly equal to the intended number of said indicia, removing said reference member and positioning in its place a scale member provided with a photo-sensitive surface while returning said loop to its starting position relative to said magnetic bar, and again moving said loop along said magneitc bar to sense inductively all of said extremes of said one set from said one to said other of said last-named extremes while exposing a plurality of limited regions of said surface to light in succession and in response to the sequential inductive sensing of said extremes of said one set by said loop, to thereby produce photographically on said scale member the desired indicia accurately spaced from each other by exactly $\lambda/2$.

2. The method of producing a multi-indicia scale, comprising the steps of generating a standing ultrasonic wave having two sets of alternating nodal and antinodal extremes and a predetermined wavelength $\lambda$, with $\lambda/2$ being exactly equal to the desired spacing between each of said indicia and the next adjacent indicium, providing a reference member fixed in position and having accurately spaced end gauge marks corresponding to the intended opposite end indicia of said scale to be produced, first sensing one of said extremes of one of said sets while simultaneously sighting one of said end gauge marks on said reference member, thereafter sensing along said standing wave until the other end gauge mark is sighted to ensure that, concurrently with sighting of the latter, another extreme of said one set is sensed and that the number of said extremes of said one set sensed from said one to said other of said extremes of said one set is exactly equal to the intended number of said indicia, removing said reference member and positioning in its place a scale member provided with a photo-sensitive surface, and again sensing along said standing wave to sense all of said extremes of said one set from said one to said other of said last-named extremes while exposing a plurality of limited regions of said surface to light in succession and in response to the sequential sensing of said extremes of said one set, to thereby produce photographically on said scale member the desired indicia accurately spaced from each other by exactly $\lambda/2$.

3. Apparatus for controlling the displacement of a body along a path, comprising a solid bar magnet having spaced ends, sonic frequency generating means comprising a quartz crystal contacting one end of said bar, and a source of high frequency electrically connected across said crystal, for forming in said bar and between said ends thereof a standing sonic wave having a plurality of alternating nodal and antinodal extremes and a predetermined wave length $\lambda$, with $\lambda/2$ being exactly equal to a fixed fractional increment of the length of said path and the overall length of said path being $n\lambda/2$ where $n$ is an integer, to thereby dispose two identical ones of said extremes in said bar at spaced locations corresponding to the opposite ends of said path, and to dispose others of said extremes identical with said two extremes at spaced positions in said bar intermediate said locations and corresponding to the opposite termini of each of said increments of the length of said path, sensing means including a sensing element arranged adjacent said bar for sensing said extremes, said sensing means comprising an electrically conductive loop encircling said bar in a plane substantially transverse to the longitudinal dimension of the latter and constituting said sensing element, amplifier means connected to said loop for amplifying voltages induced in said loop as the latter passes said identical extremes, means connected to said amplifier means for indicating the individual ones of said identical extremes inductively sensed by said loop, means operatively connected to said body and said element for moving said body along said path and for synchronously therewith moving said sensing element along said bar, whereby in the intervals from the sensing of each one of said identical extremes to the sensing of the next subsequent one of said identical extremes said body is displaced by uniform and accurately measured increments, and integrating means connected to said amplifier means for summing up said voltages induced in said loop to provide an indication of said total distance through which said body has been displaced along said path.

4. Apparatus according to claim 3, said sensing element further comprising another electrically conductive loop connected in series with said first-named loop and disposed in a plane parallel to the plane of said first-named loop so as to ensure that currents in said loops flow in opposite directions about the centers of said loops.

5. Apparatus according to claim 4, the planes of said loops being arranged a distance $n\lambda/2$ apart, where $n$ is an odd integer.

6. Apparatus according to claim 4, said sensing means further comprising a glass plate disposed in a plane substantially transverse to the longitudinal dimension of said bar, said glass plate being connected to said moving means and being provided with an interior aperture through which said bar extends, said glass plate being $n\lambda/2$ thick, where $n$ is an odd integer, said loops being affixed to the opposite faces of said glass plate substantially concentrically with said aperture thereof.

7. Apparatus according to claim 6, further comprising a magnetic housing for said bar, said housing supporting said bar in fixed position and being coextensive with said bar, and means operatively connected to said housing for adjusting the position of said housing and said bar relative to said glass plate and said loops.

8. Apparatus for controlling the displacement of a body along a path, comprising a solid magnetized bar having spaced ends, sonic frequency generating means comprising a quartz crystal contacting one end of said bar and a source of high frequency electrically connected across said crystal, for compressively vibrating said bar longitudinally and forming in said bar and between said ends thereof magnetic oscillations which produce a standing wave having a plurality of alternating nodal and antinodal extremes and a predetermined wavelength $\lambda$, with $\lambda/2$ being exactly equal to a fixed fractional increment of the length of said path and the overall length of said path being $n\lambda/2$ where $n$ is an integer, to thereby dispose two identical ones of said extremes in said bar at spaced locations corresponding to the opposite ends of said path, and to dispose others of said extremes identical with said two extremes at spaced positions in said bar intermediate said locations and corresponding to the opposite termini of each of said increments of the length of said path, sensing means including a sensing element arranged adjacent said bar for sensing said extremes, means operatively connected to said body and said element for moving said body along said path and for synchronously therewith moving said sensing element along said bar, whereby in the intervals from the sensing of each one of said identical extremes to the sensing of the next subsequent one of said identical extremes said body is displaced by uniform and accurately measured increments, a sourse of light carried by said body for displacement therewith along said path, said source of light being operatively connected to said sensing element for energization by the latter each time said element senses one of said identical extremes, and a member provided with a photo-sensitive surface stationarily positioned adjacent said path with said surface facing said source of light, whereby there are photographically formed on said member a plurality of indicia spaced from each other by $\lambda/2$ as said body is moved along said path by said moving means.

9. Apparatus according to claim 8, said bar being a magnet, said sonic frequency generating means comprising a quartz crystal contacting said one end of said bar, and a source of high frequency electrically connected across said crystal, and said sensing means comprising an electrically conductive loop encircling said bar in a plane substantially transverse to the longitudinal dimension of said bar and constituting said sensing element, amplifier means connected to said loop for amplifying voltages induced in said loop as the latter passes said identical extremes, means connected to said amplifier means for indicating the individual ones of said identical extremes inductively sensed by said loop, and integrating means connected to said amplifier means for summing up said voltages induced in said loop to provide an indication of the total distance through which said body and said source of light have been displaced along said path, said source of light being connectable electrically to said amplifier means.

10. Apparatus according to claim 9, said sensing means further comprising a magnetic housing for said bar, said housing fixedly supporting said bar and being coextensive with the latter, and a glass plate carried by said body in a plane substantially transverse to the longitudinal dimension of said bar, said glass plate being provided with an interior aperture through which said bar extends, said loop being fixedly mounted on said glass plate substantially concentrically with said aperture thereof.

11. Apparatus for controlling the displacement of a body along a path, comprising a magnetized longitudinal member, oscillatory generating means connected with one end of said member for producing compressive longitudinal mechanical vibrations in said member so as to produce oscillating magnetic fields having a plurality of discrete locations of maximum and minimum magnetic oscillations, and sensor means responsive to said oscillating fields cooperatively movable with said body along said path.

12. Apparatus as in claim 11 wherein said sensor means comprise an electrically conductive coil positioned adjacent said member so as to have electrical currents induced therein by the magnetic oscillations.

13. An apparatus for controlling the displacement of a body along a path comprising a magnetized longitudinal member positioned parallel to said path, electrical generating means producing alternating electrical variations, piezoelectric means electrically connected to said electrical generating means and mechanically positioned at one end of said member so as to produce longitudinal mechanical vibrations in the member thereby causing a plurality of oscillating magnetic fields having a plurality of discrete locations of maximum and minimum magnetic oscillations, and sensor means responsive to the oscillating fields connected to said body and movable therewith along the path, said sensor means being capable of indicating the discrete locations of maximum and minimum magnetic oscillations.

14. An apparatus as set forth in claim 13, wherein said sensor means comprise an electrically conductive coil positioned around said member for responding to the magnetic oscillations around said member.

References Cited in the file of this patent

UNITED STATES PATENTS

| | | |
|---|---|---|
| 2,275,977 | Means et al. | Mar. 10, 1942 |
| 2,300,803 | Pattee | Nov. 3, 1942 |
| 2,394,455 | Koch | Feb. 5, 1946 |
| 2,394,461 | Mason | Feb. 5, 1946 |
| 2,401,094 | Nicholson | May 28, 1946 |
| 2,506,141 | Drouin | May 2, 1950 |
| 2,680,837 | Sensiper | June 8, 1954 |
| 2,758,663 | Snavely | Aug. 14, 1956 |
| 2,768,701 | Summers | Oct. 30, 1956 |

FOREIGN PATENTS

| | | |
|---|---|---|
| 601,961 | Great Britain | May 18, 1948 |